(12) United States Patent
Rathinasamy et al.

(10) Patent No.: US 11,875,141 B2
(45) Date of Patent: Jan. 16, 2024

(54) SYSTEM AND METHOD FOR TRAINING A NEURAL MACHINE TRANSLATION MODEL

(71) Applicant: INFOSYS LIMITED, Bangalore (IN)

(72) Inventors: Kamalkumar Rathinasamy, Tamilnadu (IN); Amanpreet Singh, Rajasthan (IN); Balaguru Sivasambagupta, Bengaluru (IN); Prajna Prasad Neerchal, Kasaragod Dist. (IN); Vani Sivasankaran, Tamilnadu (IN)

(73) Assignee: INFOSYS LIMITED, Bangalore (IN)

( * ) Notice: Subject to any disclaimer, the term of this patent is extended or adjusted under 35 U.S.C. 154(b) by 121 days.

(21) Appl. No.: 17/532,948

(22) Filed: Nov. 22, 2021

(65) Prior Publication Data

US 2022/0164174 A1 May 26, 2022

(30) Foreign Application Priority Data

Nov. 20, 2020 (IN) .............................. 202041050659

(51) Int. Cl.
*G06F 8/51* (2018.01)
*G06N 3/08* (2023.01)
*G06F 8/41* (2018.01)
*G06F 40/40* (2020.01)

(52) U.S. Cl.
CPC ................ *G06F 8/51* (2013.01); *G06F 8/447* (2013.01); *G06N 3/08* (2013.01); *G06F 40/40* (2020.01)

(58) Field of Classification Search
None
See application file for complete search history.

(56) References Cited

U.S. PATENT DOCUMENTS

| 5,768,564 | A | * | 6/1998 | Andrews | .................. | G06F 8/51 |
| | | | | | | 717/137 |
| 6,519,768 | B1 | * | 2/2003 | Hughes | .................. | G06F 8/447 |
| | | | | | | 717/154 |
| 7,240,338 | B1 | * | 7/2007 | Bell | .......................... | G06F 8/51 |
| | | | | | | 717/137 |
| 8,051,410 | B2 | | 11/2011 | Marfatia et al. | | |
| 8,762,962 | B2 | * | 6/2014 | Ben-Artzi | ................. | G06F 8/51 |
| | | | | | | 717/137 |
| 10,545,733 | B2 | | 1/2020 | Sabharwal et al. | | |
| 10,581,888 | B1 | | 3/2020 | Agranonik et al. | | |
| 10,747,962 | B1 | * | 8/2020 | Fuerstenau | ............ | G06N 3/045 |
| 10,839,164 | B1 | * | 11/2020 | Shorter | ................... | G06F 40/42 |
| 11,307,831 | B2 | * | 4/2022 | Allamanis | ................. | G06F 8/33 |

(Continued)

*Primary Examiner* — Jason D Mitchell
(74) *Attorney, Agent, or Firm* — Troutman Pepper Hamilton Sanders LLP (Rochester)

(57) ABSTRACT

The system and method for training a neural machine translation (NMT) model is disclosed wherein training data in terms of source statements and equivalent targets statements may be received. The source statements and equivalent targets statements may be encoded using source and target vocabulary respectively. A source-target map containing relation between tokens is created. The source statements and equivalent target statements is split into multiple fragments using fragments generator based on the source-target map. Such generated multiple fragments are used to train NMT model. Whenever the trained NMT model receives a source codes as input, the source codes are transformed to target codes.

12 Claims, 5 Drawing Sheets

(56) References Cited

U.S. PATENT DOCUMENTS

| | | | |
|---|---|---|---|
| 2016/0117316 A1* | 4/2016 | Le | G06F 40/45 |
| | | | 704/9 |
| 2018/0210878 A1 | 7/2018 | Lee et al. | |
| 2018/0267883 A1* | 9/2018 | Tezuka | G06F 8/00 |
| 2018/0300317 A1* | 10/2018 | Bradbury | G06F 40/44 |
| 2019/0012168 A1* | 1/2019 | Miyashita | G06F 8/51 |
| 2019/0172466 A1* | 6/2019 | Lee | G06N 3/08 |
| 2019/0272318 A1 | 9/2019 | Suzuki et al. | |
| 2019/0294684 A1 | 9/2019 | Joo et al. | |
| 2020/0097554 A1* | 3/2020 | Rezagholizadeh | G06N 3/084 |
| 2020/0285807 A1* | 9/2020 | Xu | G06N 3/04 |
| 2021/0011694 A1* | 1/2021 | Ni | G06F 8/53 |
| 2021/0124738 A1* | 4/2021 | Swamy | G06N 20/00 |
| 2021/0357762 A1* | 11/2021 | Clement | G06N 3/045 |
| 2022/0308848 A1* | 9/2022 | Clement | G06F 8/51 |

* cited by examiner

SYSTEM AND METHOD FOR TRAINING A NEURAL MACHINE TRANSLATION MODEL

This application claims the benefit of Indian Patent Application Serial No. 202041050659, filed Nov. 20, 2020, which is hereby incorporated by reference in its entirety.

FIELD

The present technique relates to Neural Networks. More specifically, the technique relates to Neural Machine Translation model for programming languages.

BACKGROUND

Programming language translations are typically performed by writing rules. Rule based approach involves constructing abstract syntax tree of the source statement, generating corresponding target language abstract syntax tree and decoding them as target statement. There are many tools available (like Ora2Pg & AWS SCT for Oracle to Postgres migration) to perform such translation and the tools available in the market claim to cover majority of the scenarios. During migration of projects/applications from a platform of one programing language to another platform of another programming language, the mentioned tools are employed to ease the translations, followed by experts to validate and fix the results.

Neural Machine Translation (NMT) models are deep learning models which can translate from one natural language to another natural language, like English to French. These models learn the nuances of translation from sample inputs which is also referred as training data. Bulk volume of English and French statement pairs are passed as input to NMT models for training. It is easier to collect and provide training data than to identify and implement rules. Hence, NMTs are very popular and successful in performing natural language translation. Though NMT models eases the process of translation, the training data is what makes the NMT model more efficient and generation of effective training data to train the NMT model is an area which requires lot of improvement as of now.

Hence there is a need of solution to overcome the problems in the area of Neural Machine Translation mentioned above.

SUMMARY

Disclosed are a system, a method and/or non-transitory computer readable storage medium for training a neural machine translation model for programming languages.

In one aspect, a computer implemented method for neural machine translation model is disclosed. The method comprises, receiving one or more source statements and equivalent target statements. The received one or more source statements and equivalent target statements are encoded using a predefined token dictionary. The one or more tokens in the one or more source statements are encoded using the predefined token dictionary if they are not present in the source vocabulary. Similarly, the one or more tokens in the equivalent target statements are encoded using the predefined token dictionary if they are not present in the target vocabulary. A source-target map is created using the encoded one or more source statements and the encoded equivalent target statements.

The source-target map is created using a source vocabulary along with the encoded one or more source statements and the encoded equivalent target statements. For each token in the source vocabulary, a set of encoded one or more source statements containing the token of the source vocabulary is identified. A set of encoded equivalent target statements is also identified for each set of encoded one or more source statements. A set of intersecting source tokens comprising such tokens which are common across statements within each set of the encoded one or more source statements is determined. An equivalent set of intersecting target tokens comprising such tokens which are common across statements within each set of the encoded equivalent target statements is also determined. A first subset of source-target map is generated by removing/eliminating the determined set of intersecting source tokens from the encoded one or more source statements, and removing/eliminating the determined set of intersecting target tokens from the encoded equivalent target statements. A second subset of source-target map is generated by determining and extracting unique tokens within the set of intersecting source tokens, and determining and extracting unique tokens within the set of intersecting target tokens. The source-target map is generated by appending the first subset of source-target map and the second subset of source-target map.

Each of the encoded one or more source statements and the encoded equivalent target statements are split using the source-target map to generate one or more fragments of the one or more source statements and the corresponding fragments of the equivalent encoded target statements. The each of the one or more encoded source statements and the equivalent encoded target statements are fragmented iteratively until—all the tokens in each of the encoded one or more source statements are traversed and length of fragments of both the encoded one or more source statements and the encoded equivalent target statements are within the predefined threshold. The one or more fragments of the one or more source statements and the corresponding fragments of the encoded equivalent target statements are provided as input to Neural Network causing the generation of trained neural machine translation model for programming languages.

In another aspect, a system for neural machine translation model is disclosed. The system comprises one or more components comprising at least one processor to execute programming instructions to perform one or more steps such as, receiving one or more source statements and equivalent target statements. The received one or more source statements and equivalent target statements are encoded using a predefined token dictionary. The one or more tokens in the one or more source statements are encoded using the predefined token dictionary if they are not present in the source vocabulary. Similarly, the one or more tokens in the equivalent target statements are encoded using the predefined token dictionary if they are not present in the target vocabulary. A source-target map is created using the encoded one or more source statements and the encoded equivalent target statements.

The source-target map is created using a source vocabulary along with the encoded one or more source statements and the encoded equivalent target statements. For each token in the source vocabulary, a set of encoded one or more source statements containing the token of the source vocabulary is identified. A set of encoded equivalent target statements is also identified for each set of encoded one or more source statements. A set of intersecting source tokens comprising such tokens which are common across statements within each set of the encoded one or more source statements is determined. An equivalent set of intersecting target tokens comprising such tokens which are common across statements within each set of the encoded equivalent target statements is also determined. A first subset of source-target map is generated by removing/eliminating the determined set of intersecting source tokens from the encoded one or more source statements, and removing/eliminating the determined set of intersecting target tokens from the encoded equivalent target statements. A second subset of source-target map is generated by determining and extracting unique tokens within the set of intersecting source tokens, and determining and extracting unique tokens within the set of intersecting target tokens. The source-target map is generated by appending the first subset of source-target map and the second subset of source-target map.

Each of the encoded one or more source statements and the encoded equivalent target statements are split using the source-target map to generate one or more fragments of the one or more source statements and the corresponding fragments of the equivalent encoded target statements. The each of the one or more encoded source statements and the equivalent encoded target statements are fragmented iteratively until—all the tokens in each of the encoded one or more source statements are traversed and length of fragments of both the encoded one or more source statements and the encoded equivalent target statements are within the predefined threshold. The one or more fragments of the one or more source statements and the corresponding fragments of the encoded equivalent target statements are provided as input to Neural Network causing the generation of trained neural machine translation model for programming languages.

In yet another aspect, a non-transitory computer readable storage medium for neural machine translation model is disclosed, comprising one more machine readable instructions to perform one or more steps such as, receiving one or more source statements and equivalent target statements. The received one or more source statements and equivalent target statements are encoded using a predefined token dictionary. The one or more tokens in the one or more source statements are encoded using the predefined token dictionary if they are not present in the source vocabulary. Similarly, the one or more tokens in the equivalent target statements are encoded using the predefined token dictionary if they are not present in the target vocabulary. A source-target map is created using the encoded one or more source statements and the encoded equivalent target statements.

The source-target map is created using a source vocabulary along with the encoded one or more source statements and the encoded equivalent target statements. For each token in the source vocabulary, a set of encoded one or more source statements containing the token of the source vocabulary is identified. A set of encoded equivalent target statements is also identified for each set of encoded one or more source statements. A set of intersecting source tokens comprising such tokens which are common across statements within each set of the encoded one or more source statements is determined. An equivalent set of intersecting target tokens comprising such tokens which are common across statements within each set of the encoded equivalent target statements is also determined. A first subset of source-target map is generated by removing/eliminating the determined set of intersecting source tokens from the encoded one or more source statements, and removing/eliminating the determined set of intersecting target tokens from the encoded equivalent target statements. A second subset of source-target map is generated by determining and extracting unique tokens within the set of intersecting source tokens, and determining and extracting unique tokens within the set of intersecting target tokens. The source-target map is generated by appending the first subset of source-target map and the second subset of source-target map.

Each of the encoded one or more source statements and the encoded equivalent target statements are split using the source-target map to generate one or more fragments of the one or more source statements and the corresponding fragments of the equivalent encoded target statements. The each of the one or more encoded source statements and the equivalent encoded target statements are fragmented iteratively until—all the tokens in each of the encoded one or more source statements are traversed and length of fragments of both the encoded one or more source statements and the encoded equivalent target statements are within the predefined threshold. The one or more fragments of the one or more source statements and the corresponding fragments of the encoded equivalent target statements are provided as input to Neural Network causing the generation of trained neural machine translation model for programming languages. The method, the system, and/or the non-transitory computer readable storage medium disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

The objective of techniques in the present disclosure is to overcome the technical problem mentioned in the background section through a system, method and/or non-transitory computer readable storage medium for training a neural machine translation model for programming languages.

Query translation in integral part of migration of application from one platform to another platform. For example, SQL query translation is an integral part of database migration. Programming language migration typically comprises two steps, generating compatible target language code from source language code and optimizing the generated target language code. The technique described in the present disclosure will be useful in such scenarios.

In one or more embodiments, a method, system and/or computer readable storage medium for training a neural machine translation model for programming languages. The method comprising, receiving one or more source statements and equivalent target statements. The received one or more source statements and equivalent target statements are encoded using a predefined token dictionary. The one or more tokens in the one or more source statements are encoded using the predefined token dictionary if they are not present in the source vocabulary. Similarly, the one or more tokens in the equivalent target statements are encoded using the predefined token dictionary if they are not present in the target vocabulary. A source-target map is created using the encoded one or more source statements and the encoded equivalent target statements.

The source-target map is created using a source vocabulary along with the encoded one or more source statements and the encoded equivalent target statements. For each token in the source vocabulary, a set of encoded one or more source statements containing the token of the source vocabulary is identified. A set of encoded equivalent target statements is also identified for each set of encoded one or more source statements. A set of intersecting source tokens comprising such tokens which are common across statements within each set of the encoded one or more source statements is determined. An equivalent set of intersecting target tokens comprising such tokens which are common across statements within each set of the encoded equivalent target statements is also determined. A first subset of source-target map is generated by removing/eliminating the determined set of intersecting source tokens from the encoded one or more source statements, and removing/eliminating the determined set of intersecting target tokens from the encoded equivalent target statements. A second subset of source-target map is generated by determining and extracting unique tokens within the set of intersecting source tokens, and determining and extracting unique tokens within the set of intersecting target tokens. The source-target map is generated by appending the first subset of source-target map and the second subset of source-target map.

Each of the encoded one or more source statements and the encoded equivalent target statements are split using the source-target map to generate one or more fragments of the one or more source statements and the corresponding fragments of the equivalent encoded target statements. The each of the one or more encoded source statements and the equivalent encoded target statements are fragmented iteratively until—all the tokens in each of the encoded one or more source statements are traversed and length of fragments of both the encoded one or more source statements and the encoded equivalent target statements are within the predefined threshold. The one or more fragments of the one or more source statements and the corresponding fragments of the encoded equivalent target statements are provided as input to Neural Network causing the generation of trained neural machine translation model for programming languages.

Figure 1:
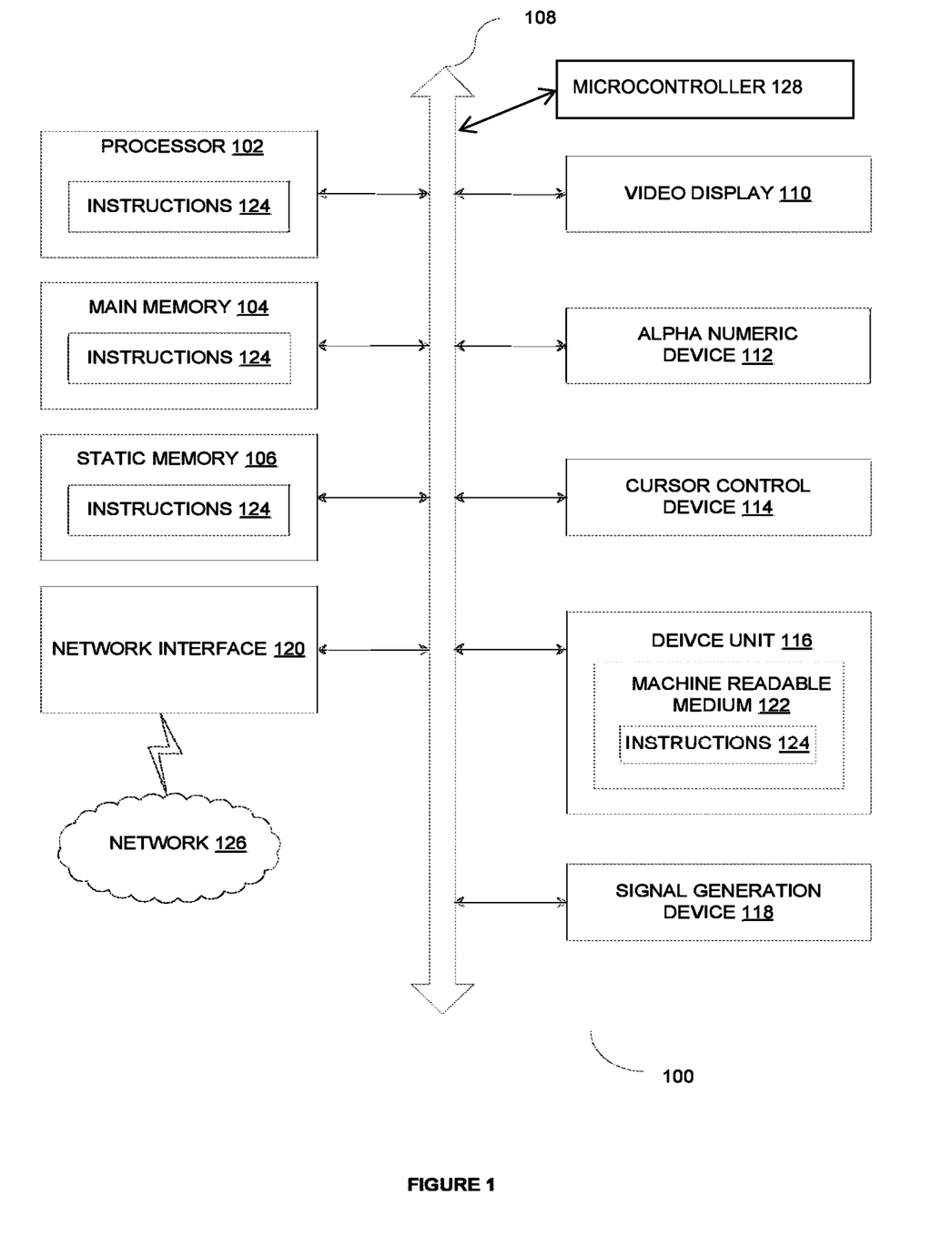
FIG. 1 is a diagrammatic representation of a data processing system capable of processing a set of instructions to perform any one or more of the methodologies herein, according to one or more embodiments.

FIG. 1 is a diagrammatic representation of a machine and/or data processing device capable of processing a set of instructions to perform any one or more of the methodologies herein, according to one embodiment. The machine and/or the data processing device in the example form, comprises a computer system 100 within which a set of instructions, for causing the machine to perform any one or more of the methodologies discussed herein, may be executed. In various embodiments, the machine operates as a standalone device and/or may be connected (e.g., networked) to other machines.

A machine may be a personal computer (PC), laptop or an embedded system and/or any machine capable of executing a set of instructions (sequential or otherwise) that specify actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

The example computer system 100 includes a processor 102 (e.g., a central processing unit (CPU) a graphics processing unit (GPU) and/or both), a main memory 104 and a static memory 106, which communicate with each other via a bus 108. The computer system 100 may further include a video display unit 110 (e.g., a liquid crystal displays (LCD) and/or a cathode ray tube (CRT)). The computer system 100 also includes an alphanumeric input device 112 (e.g., a keyboard), a cursor control device 114 (e.g., a mouse), a disk drive unit 116, a signal generation device 118 (e.g., a speaker), micro controller 128 (e.g., programmable logic controller) and a network interface 120.

The disk drive unit 116 includes a machine-readable medium 122 on which is stored one or more sets of instructions 124 (e.g., software) embodying any one or more of the methodologies and/or functions described herein. The instructions 124 may also reside, completely and/or at least partially, within the main memory 104, within the static memory 106 and/or within the processor 102 during execution thereof by the computer system 100, the main memory 104 and the processor 102 also constituting machine-readable media.

The instructions 124 may further be transmitted and/or received over a network 126 via the network interface 120. While the machine-readable medium 122 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, optical media and magnetic media.

Figure 2:
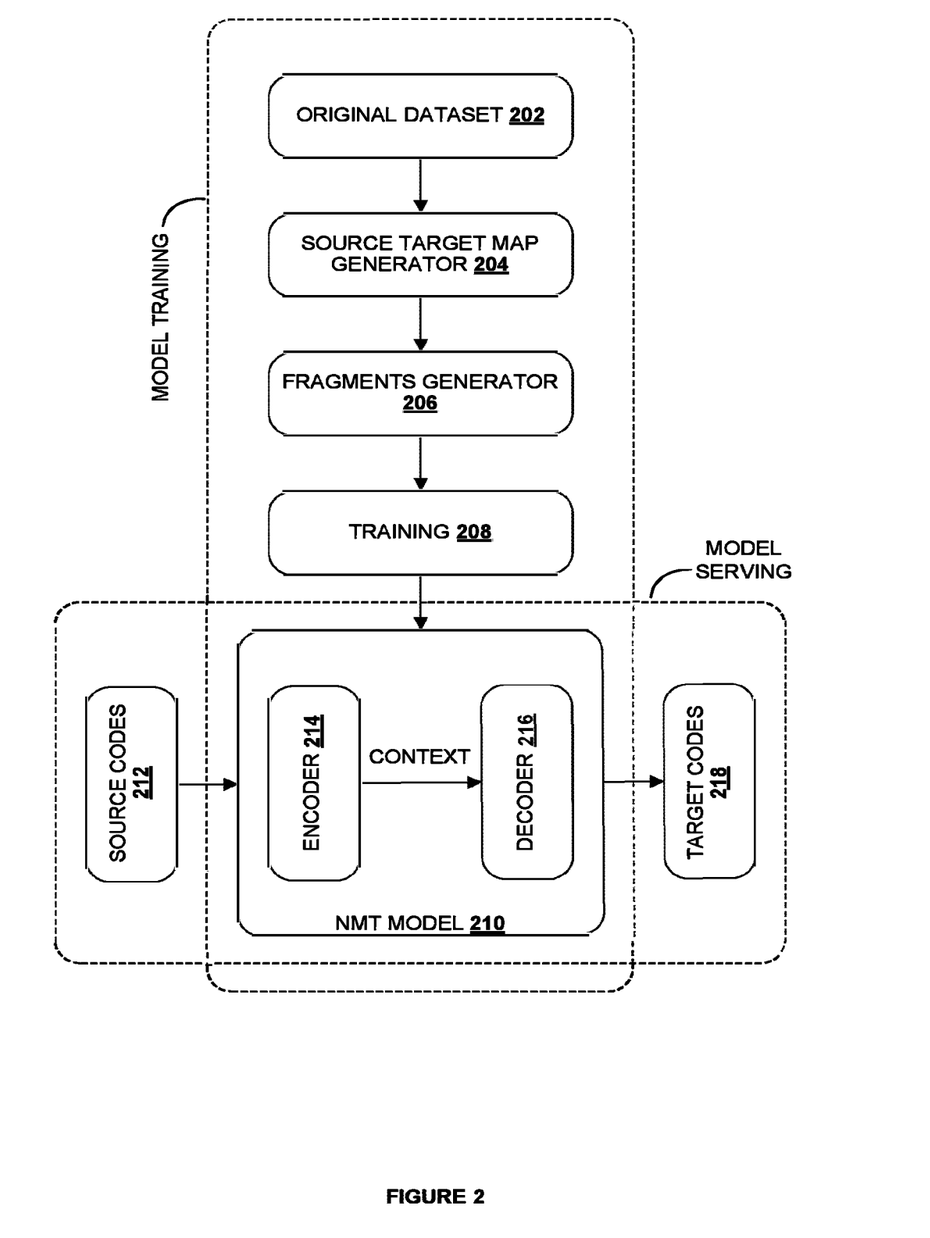
FIG. 2 is an architecture diagram illustrating components of system for training a neural machine translation model for programing languages, according to one or more embodiments.

FIG. 2 is an architecture diagram illustrating components of system for training a neural machine translation model for programing languages, according to one or more embodiments. In one or more embodiments, the system may comprise one or more components, but not limited to storage module for original data set 202, a source-target map generator 204, a fragments generator 206, a training module 208, a Neural Machine Translation (NMT) module (also referred as Neural Machine Translator) 210, source codes 212, an encoder 214, a decoder 216, and target codes 218. In model training phase, the original data set 202, a source-target map generator 204, a fragments generator 206, a training module 208 and a neural machine translation module 210 come into picture. In model serving phase, the Neural Machine Translation module 210 comprising the encoder 214 and decoder 216, source codes 216 and target codes 218 execute one or more operations to achieve translation. In one or more embodiments, NMT module may be system/framework such as, but not limited to Google's seq2seq, GoogleNMT with transformer, MarianNMT, FairSeq and/or OpenNMT.

In one or more embodiments, the original dataset 202 may comprise one or more source statements and equivalent target statements. The one or more source statements may be plurality of statements of the programming language supported by any source platform. The equivalent target statements may be plurality of statements of the programming language supported by the target platform. The term 'equivalent' here means, for each statement of the one or more source statements, there will be one target statement. For example, 'select sysdate into date from dual;' is a source statement in a source programming language and its equivalent target statement may be 'select localtimestamp into strict date;' which may be a corresponding statement in the target programming language which performs the same functionality in target platform as that of source statement in the source platform. Such one or more source statements and their equivalent target statements are received from the database, which may in hundreds to thousands in number, depending on the source programming language and/or target programming language. Each of the tokens in the one or more source statements and equivalent target statements are encoded using the source vocabulary and target vocabulary respectively, along with a predefined token dictionary.

In one or more embodiments, the source vocabulary may comprise keywords that can occur in source programming language. Similarly, the target vocabulary may comprise keywords that can occur in the target programming language. The predefined token dictionary may comprise replacement tokens for special characters, numbers and other tokens which are not defined in source vocabulary and/or target vocabulary. Each token in all the one or more source statements may be parsed and those tokens and/or special characters which are not present in the source vocabulary may be replaced with tokens using the predefined token dictionary, thus creating encoded one or more source statements. Further, those tokens from the predefined token dictionary which are used to replace the tokens or special characters in each of the one or more source statements are added to the source vocabulary to create an updated source vocabulary. Similarly, each token in all the equivalent target statements may be parsed and those tokens or special characters which are not present in the target vocabulary may be replaced with tokens using the predefined token dictionary, thus creating encoded equivalent target statements. Further, those tokens from the predefined token dictionary which are used to replace the tokens or special characters in each equivalent target statements are added to the target vocabulary to create an updated target vocabulary. All the encoded one or more source statements and the encoded equivalent target statements along with the updated source vocabulary and target vocabulary are provided as input to the source-target map generator 204 to generate source-target map, which is described in relation to FIG. 3.

Figure 3:
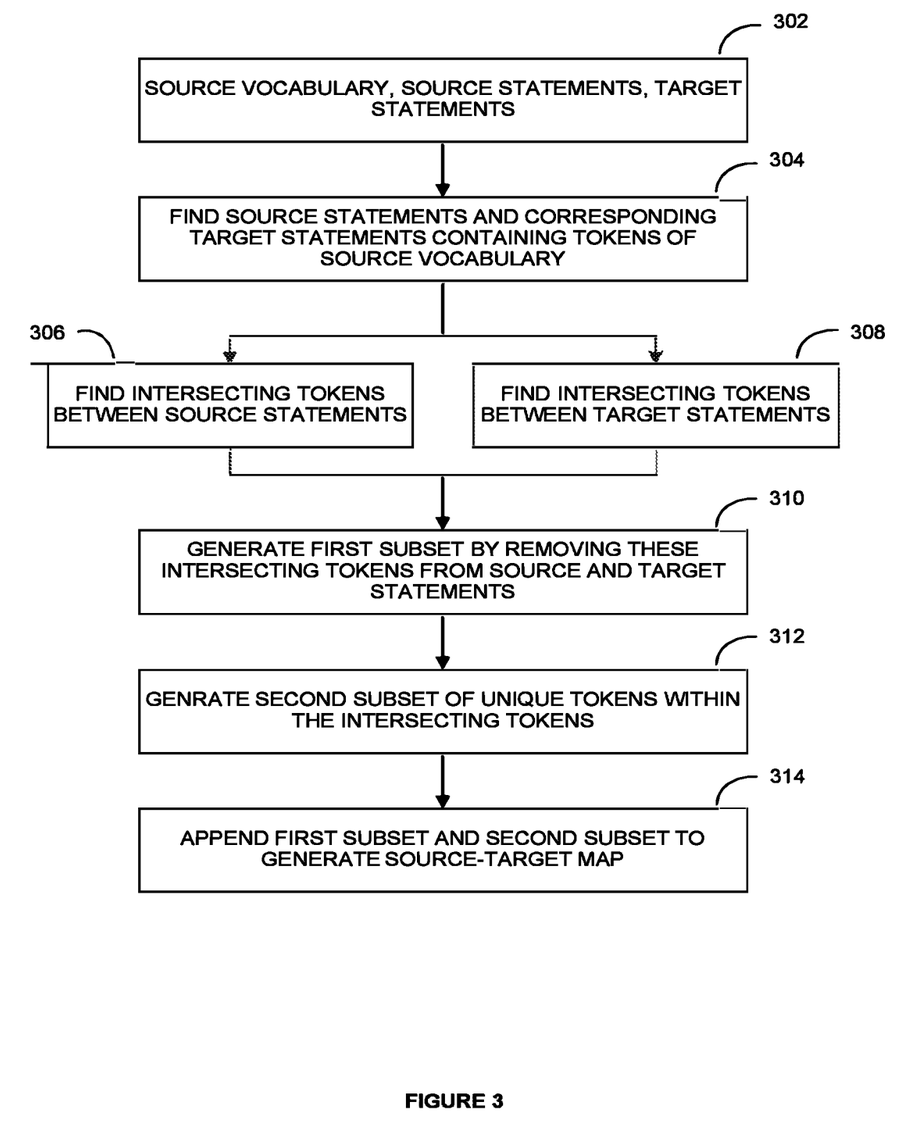
FIG. 3 is flowchart illustrating steps performed by the system to create source-target map, according to one or more embodiments.

FIG. 3 is flowchart illustrating steps performed by the system to create source-target map, according to one or more embodiments. In one or more embodiments, the source-target map generator 204 may be configured to receive encoded one or more source statements and encoded equivalent target statements to generate source-target map which comprises set of unique source-target mapping tokens, which also indicates the relation between source and source tokens as well as source and target tokens. The term 'relation' here may indicate—for example, the conditions on which two tokens may occur together always and/or which token from target language is to be used to replace the token of source language. It is to be observed that the encoded one or more source statements are considered primarily for determining set of unique source-target mapping tokens. Steps that are performed on encoded one or more source statements may be replicated to encoded equivalent target statements in relation to encoded one or more source statements, as described in subsequent paragraphs.

In one or more embodiments, an updated source vocabulary is received as input, as in step 302 along with the encoded one or more source statements and the encoded equivalent target statements. The updated source vocabulary may comprise single instance of—all tokens that can occur in a source programming language and/or all tokens that are present in the encoded one or more source statements. Each token from the updated source vocabulary may be selected one at a time, in an order, by parsing the source vocabulary. The selected token is searched for at least one occurrence in each of the encoded one or more source statements. The encoded equivalent target statement for that source statement may be also identified, as in step 304. This combination of the identified one or more encoded source statements and encoded equivalent target statements for each token from updated source vocabulary are stored as a set of pairs of source statements and target statements associated with the selected token from the updated source vocabulary. Similarly, set of pairs of encoded source statements and target statements are identified for all the tokens in the updated source vocabulary and may be marked to be associated with that token from the updated source vocabulary. This step of identifying set of pairs source and target statements are performed by the system until all the tokens in the updated source vocabulary are traversed. For example, if the updated source vocabulary comprises 'n' tokens, then the result may be 'n' set of pairs of source and target statements. The number of pairs in each set may depend on total number of encoded source statement in which the chosen token from the update source vocabulary appears at least once. For example, if a first token of the updated source vocabulary is identified in 1000 encoded source statements out of 200,000 encoded source statements, then the set associated with first token may contain 1000 pairs of source and target statements.

One or more intersecting source tokens within each set of pairs of source statements and target statements may be determined and extracted, as in step 306. One or more intersecting target tokens are identified within each set of pairs of target statements, as in step 308. Intersecting tokens (also referred as 'common tokens') here means such tokens which are present in common across all the encoded source statements and similarly in target statements within each set. Such intersecting tokens may be identified for all sets identified in step 304. This illustrates that for each token in the updated source vocabulary, the one or more encoded source statements comprising the token of the source vocabulary is identified along with the equivalent target statements and then the common tokens within the sets are identified for all sets. This may result in identification of set of common source tokens in the encoded one or more source statements and set of common target tokens in the equivalent target statements for each token in the updated source vocabulary.

In one more embodiments, each token from the set of common source tokens may be searched in encoded one or more source statements and each token from the set of common target tokens may be searched in encoded equivalent target statements. When both condition satisfies, set of common source tokens may be removed from the encoded one or more source statements and set of common target tokens may be removed from the encoded equivalent target statements, thereby emphasizing 1:1 relation between source statements and target statements. Further, the resultant encoded one or more source statements and the equivalent target statements may be sorted in ascending order based on the length of the statements. After sorting, the common tokens among the resultant encoded one or more source statements and the equivalent target statements are removed to create first subset of source-target map (also referred as 'first portion of source-target map'), as in step 310.

Referring back to the set of common source tokens and target tokens identified and extracted in step 306 and 308, unique tokens within the set of common source tokens and set of common target tokens may be identified by—sorting the set of common source tokens and target tokens, and removing the common tokens within them to generate a second subset of the source-target map (also referred as 'second portion of source-target map'), as in step 312. The second subset of the source-target map may be appended to the first subset of source-target map to generate the source-target map, as in step 314. The generated source-target map may be stored and further used to split the encoded one or more source statements and encoded equivalent target statements which is used as training data for Neural Machine Translation model.

Referring back to FIG. 2, the fragments generator 206 may be configured to generate the training data using encoded one or more source statements and encoded equivalent target statements, wherein these statements may be split meaningfully (i.e., without breaking the relation between the tokens), based on the source-target map generated by the source-target map generator 204. The steps performed by the fragments generator 206 of the neural machine translation model for programing languages is described in relation to FIG. 4.

Figure 4:
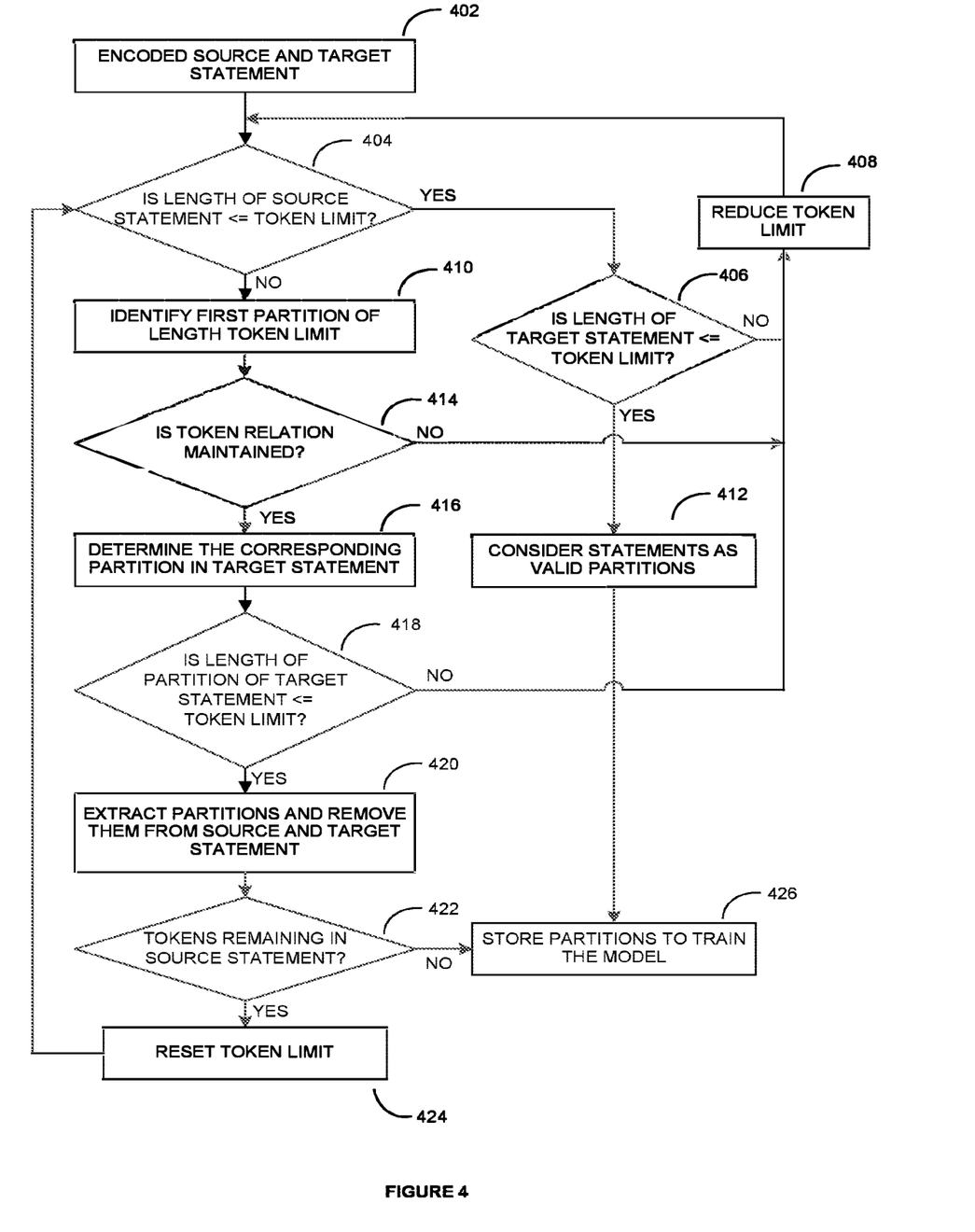
FIG. 4 is flowchart illustrating steps performed by the system to generate dataset to train neural machine translation model for programing languages, according to one or more embodiments.

FIG. 4 is flowchart illustrating steps performed by the system to generate dataset to train neural machine translation model for programming languages, according to one or more embodiments. In one or more embodiments, steps disclosed in FIG. 4 may be performed for each of the encoded on or more source statements and encoded equivalent target statements, i.e. the steps are preformed iteratively until all of the one or more source statements and equivalent target statements are processed.

In one or more embodiments, the encoded one or more source statements and encoded equivalent target statements may be received, as in step 402. As one of the intentions of the present technique is to reduce the length of training dataset, meaningfully, for efficient training, a check may be performed to determine whether the statements meets the threshold length limit set for the Neural Machine Translation model, as in step 404. Initially token limit is set to value of threshold length. The length here refers to number of tokens in statement or partition. The threshold length limit is the maximum number of tokens that NMT model can accept as a statement. To simplify the explanation, let us consider one encoded source statement and its equivalent encoded one target statement as an example to understand steps performed to fragment source and target statements. A check may be performed whether length of the encoded source statement is within the token limit, as in step 404. If the length of the encoded source statement is less than or equal to token limit, then the length of the encoded equivalent target statement may be checked, as in step 406. If the length of the encoded equivalent target statement is less than or equal to the token limit, both the encoded source statement and the encoded equivalent target statement may be considered as valid partitions to be provided as input to NMT model, as in step 412. The partitions obtained from step 412 may be stored as it meets the requirement to be considered as training data set for Neural Machine Translation model. If the length of the encoded equivalent target statement is more than the token limit, there may be need to reduce the token limit as length of both the source statement and target statement needs to be within the threshold limit. Hence the token limit may be reduced as in step 408 and the step 404 may be executed by the system again. The reduction of token limit i.e. by how many counts the token limit to be reduced is described in subsequent paragraphs.

There may be possibility that length of source statement is within the limit but length of target statement is more than the length of source statement. The target programming language may contain, for example, two keywords to perform the same functionality of one keyword of source statement, as it depends on the target platform chosen during the project/application migration activity. The other way round may also be possible, i.e. length of target statement is less than source statement. In such case, both the source statements and target statements would be within the token limit and can directly be considered as valid partitions to be provided as input to Neural Machine Translation model for training.

In one or more embodiments, if the length of the encoded source statement is more than the token limit, the source token may be split to multiple partitions as described in the subsequent steps. A first partition of source statement of length equal to token limit may be identified, as in step 410. Now, whether the determined partition meets the token relation as set in the source-target map is checked, as in step 414. The partition must ensure that related tokens that needs to be together are not spread across the partitions. The condition to be satisfied may be—partition is of length less than or equal to token limit and at the same time the tokens which indicate relation needs to be present within the same partition (indicates 'relation' or 'meaningful' aspect). This step of generation of partitions are performed using source-target map. The generation of partitions by applying the source-target map is explained along with example with respect to FIG. 5 in subsequent paragraphs of the present disclosure. If the token relation is determined to be broken as per the check against source-target map, the token limit may be reduced based on the source-target map as in step 408 and the source statement is considered again to determine partitions, starting from step 404. If the token relation is maintained/satisfied as per the source-target map, a corresponding first partition of target statement may be extracted from equivalent target statement, as in step 416, which is explained in details with example in relation to FIG. 5. The length of the first partition from equivalent target statement is determined as in step 418. If the length of partition of the equivalent target statement is more than token limit, the token limit may reduce by a count based on relation present in the source-target map as in step 408 and the step 404 may be executed. If the length of partition of the equivalent target statement is within the token limit, then both the first partitions of source statement and target statement may be considered as valid partitions. The determined partitions are extracted from the source statement and target statements as in step 420. Further the extracted partitions are removed from the source statement and target statement i.e., the first partition of source statement may be removed from source statement and first partition of target statement may be removed from target statement, as in step 420. Now, there may be tokens left in source statement and target statement at least in the first iteration based on the condition checked at 414. The check may be performed to identify if there are any tokens remaining in the source statement, as in step 422. If yes, the token limit may be reset to the value 'threshold length' in step 424 and the step 404 may be executed, with updated source statement and target statement, and the steps are performed/executed as described above. If no tokens are remaining in the source statement, which may indicate that all the tokens in the source statement is traversed, then the extracted partitions may be stored as in step 426 to train the model. These steps may be performed iteratively until all the tokens in all the source statements are traversed and processed. The output after performing these steps may be thousands of valid partitions of source and target statement which are ready to be fed as input to train Neural Machine Translation model.

In an example embodiment, consider a case wherein the source target map contains source relations as [a, b], [c, d, e] and [f, g, h] where each of the letter represent tokens/words of a programming language such as, but not limited to from, dual, wherein, nextval etc. Consider a source statement comprises 'x, y, a, b, z, 1' tokens in source statement. Consider the threshold length to be '3'. In such case, the source statement needs to be partitioned as the length of source statement is more than the threshold. The possible partitions can be of length 3 at the first iteration. So, the possible partition can be 'x, y, a' and 'b, z, 1'. It is to be observed that, the partition is correct as length criteria is met but as per the source-target map with an assumption that even the target partitions are of length within the limit. This partition may not be correct as it is breaking the relation of 'a' and 'b'. Hence the partitions are made again and this time. In the next iteration, the possible partition may be 'x, y', 'a, b, z' and '1'. In this case, the length criterion is met and the relation is also retained. Hence this partition may be carried out and stored as dataset for training.

In another example embodiment, consider a case wherein the source target map contains source relations as [a, b], [c, d, e] and [f, g, h]. Consider a source statement comprises 'x, a, b, z, 1, k' tokens in source statement. Consider that the threshold length be '3'. So, the possible partition can be 'x, y, a', 'b, z, 1', and 'k'. It is to be observed that, the partition is correct as length criteria is met but as per the source-target map with an assumption that even the target partitions are of length within the limit. This partition may not be correct as it is breaking the relation of 'a' and 'b'. Hence the partitions are made again and this time. In the next iteration, the possible partition may be 'x, y', 'a, b, z' and '1, k'. In this case, the length criterion is met and the relation is also retained. Hence this partition may be carried out and stored as dataset for training.

Referring back to FIG. 2, in one or more embodiments, based on the training dataset received from the fragments generator 206, the training module 208 may be configured to provide the training dataset as input to NMT model 210 which causes the generation of trained Neural Machine Translation model. In order to train the model, embedding may be initialized for Neural Machine Translation model. NMT may prepare word embedding where each word is mapped to a vector of numbers. Typically, these embedding generation will start with random numbers initialization. To prepare matured embedding, where it concentrates on programming language context rather than learning natural language context (in which the program is written), the training process needs to be initialized with pre-trained embeddings so that the final embeddings derived from the present technique yield better results. Source and target programming languages uses English alphabet. Except few keywords, most of the keywords are English words. Hence, pre-trained embeddings such as, but not limited to Word2Vec and/or Glove may be used as initializer for current embeddings.

In one or more embodiments, whenever the source codes 212 are provided as input to the NMT model 210, the encoder 214 may be configured convert the source statements (or source code) into anonymized form i.e. to encode each tokens present in the source code 212. The anonymized source statements may be translated into the encoded target source codes based on context that is derived based on the training through generation of partitions using source-target map. The encoded target source codes are decoded (de-anonymized) by the decoder 216 which causes the generation of target codes 218 as output. The target codes 218 are such statements which performs the same functionality that of source codes 212 but of programming language of the target platform.

Figure 5:
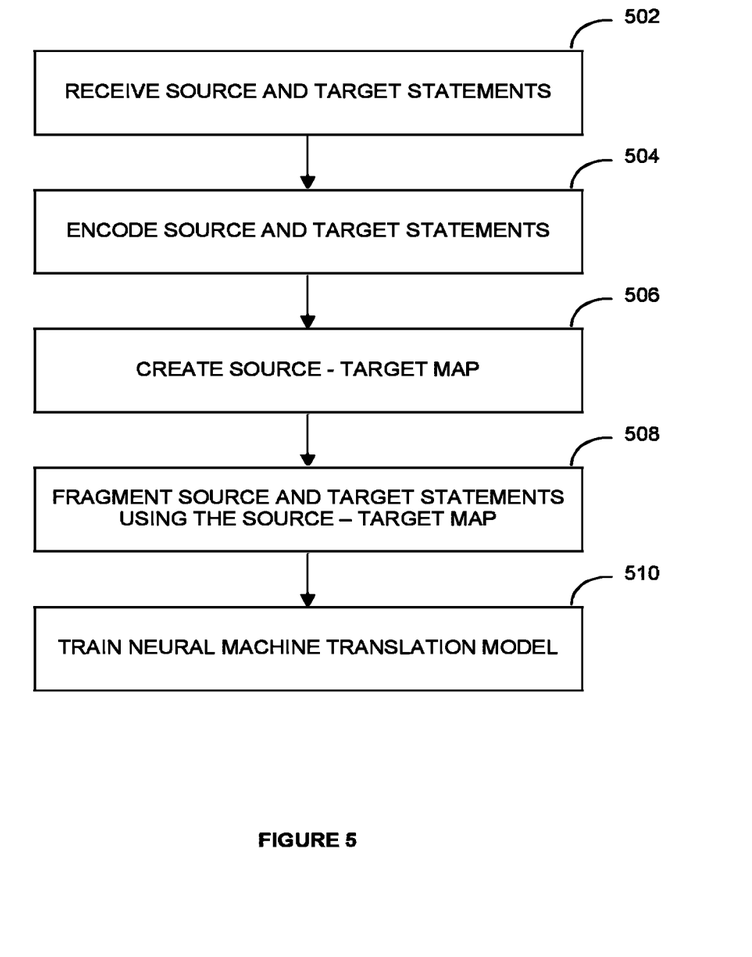
FIG. 5 is a process flow diagram illustrating a method for training a neural machine translation model for programing languages, according to one or more embodiments.

FIG. 5 is a process flow diagram illustrating a method for training a neural machine translation model for programing languages, according to one or more embodiments. In one or more embodiments, one or more source statements and their equivalent target statements may be received as in step 502.

TABLE 1

Exemplary Source Statements and Target Statements

| $X^N$: SOURCE STATEMENTS | $Y^N$: TARGET STATEMENTS |
|---|---|
| $X^1$: select sysdate into date from dual; | $Y^1$: select localtimestamp into strict date; |
| $X^2$: update options set option_id = opt_seq. nextval where add_options = True; | $Y^2$: update options set option_id = nextval ( 'opt_seq' ) where add_options = True; |
| $X^3$: select seq. nextval into sequence from sequence_table; | $Y^3$: select nextval ( 'seq' ) into strict sequence from sequence_table; |
| $X^4$: select * from track where opt_id = track_id; | $Y^4$: select * from track where opt_id = track_id; |

In one or more embodiments, Table 1 illustrates exemplary one or more source statements and their equivalent target statements, wherein:

$X^N$ represents source statements;

$Y^N$ represents target statements; and

N represents the total number of source statements which is also same as number of equivalent target statements.

In one or more embodiments, a statement $Y^N$ may be considered as an equivalent target statement (also termed as 'corresponding statement') for source statement $X^N$. For example, the statement $Y^1$ may be the equivalent target statement of source statement of $X^1$, the statement $Y^2$ may be the equivalent target statement of $X^2$ and so on. The received one or more source statements and the equivalent target statements may be encoded using a predefined token dictionary, as in step 504. The predefined token dictionary may comprise a set of special characters which may appear in source and target statements and their encoded versions which may be used as replacements for special characters in source statements and target statements. Neural machine Translation models typically ignore special characters. In natural language machine translation, special characters don't play major role whereas in programming language special character are vital. Hence any symbol with a special token may be replaced with encoded tokens using predefined token dictionary. The predefined token dictionary may comprise, but is not limited to, special token for every special character, a special token for numbers, and/or a special token for every string excluding vocabulary. Those one or more tokens or special characters present in the one or more source statements but not present in the source vocabulary may be encoded using predefined token dictionary. Similarly, one or more tokens or special characters present in the equivalent target statements but not in the target vocabulary may be encoded using the predefined token dictionary.

Exemplary source vocabulary may be $V_x$=[select, sysdate, into, from, dual, update, set, where, nextval], wherein:
   Vx represents the set of source vocabulary for source programming language.

Exemplary target vocabulary may be $V_y$=[select, localtimestamp, into, strict, update, set, nextval, where], wherein:
   Vy represents the set of source vocabulary for source programming language.

Exemplary predefined token dictionary may look like:
   Token Dictionary={'::': 'spdoublecolonsp', '(+)': 'spouterjoinsp', '< >': 'spinequallsp', '=<': 'spequalltspc', '=>': 'spequalgtsp', '||': 'sppipesp', ',': 'spcommasp', '.': 'spdotsp', '<': 'spltsp', '"': 'spquotesp', " ": 'spdblqtsp', ':': 'spcolonsp', '*': 'spstarsp', '/': 'spslashsp', '=': 'spequalsp', '(': 'spopenbrsp', ')': 'spclosebrsp', '{': 'spopencurlsp', ']': 'spclosesqbrktsp', '%': 'sppercentsp', ';': 'spsemicolonsp', 'ENCODED_NAME': 'ispentitysp', 'ENCODED_NUMBER': 'spzerosp'}

After encoding the one or more source statements and equivalent target statements present in Table 1, the resultant statements may look as illustrated in Table 2, wherein
   $\_X^N$ represents encoded source statements;
   $\_Y^N$ represents encoded target statements; and
   N represents the total number of encoded source statements which is also same as number of encoded equivalent target statements.

TABLE 2

Exemplary encoded Source Statements and encoded Target Statements

| $\_X^N$: SOURCE STATEMENTS | $\_Y^N$: TARGET STATEMENTS |
| --- | --- |
| $\_X^1$: select sysdate into date from dual spsemicolonsp | $\_Y^1$: select localtimestamp into strict date spsemicolonsp |
| $\_X^2$: update spentitysp set spentitysp spequalsp spentitysp spdotsp nextval where spentitysp spequalsp spentitysp spsemicolonsp | $\_Y^2$: update spentitysp set spentitysp spequalsp nextval spopenbrsp spquotesp spentitysp spquotesp spclosebrsp where spentitysp spequalsp spentitysp spsemicolonsp |
| $\_X^3$: select spentitysp spdotsp nextval into spentitysp from spentitysp spsemicolonsp | $\_Y^3$: select nextval spopenbrsp spquotesp spentitysp spquotesp spclosebrsp into strict spentitysp from spentitysp spsemicolonsp |
| $\_X^4$: select spstarsp from spentitysp where spentitysp spequalsp spentitysp spsemicolonsp | $\_Y^4$: select spstarsp from spentitysp where spentitysp spequalsp spentitysp spsemicolonsp |

In one or more embodiments, the source vocabulary and target vocabulary may be updated based on the encoded one or more source statements and equivalent target statements. Whenever a token is encoded in a source statement using the predefined token dictionary, the encoded token is added to the source vocabulary, to generate updated source vocabulary. Similarly, whenever a token is encoded in a target statement using the predefined token dictionary, the encoded token may be added to the target vocabulary, to generate updated target vocabulary. After the update, the source vocabulary and target vocabulary may look as mentioned below.

In one or more embodiments, updated source vocabulary may look like Vx=[select, sysdate, into, from, dual, update, set, where, nextval, spentitysp, spequalsp, spstarsp, spdotsp, spsemicolonsp] and updated target vocabulary may look like Vy [select, localtimestamp, into, strict, update, set, nextval, where, spstarsp, spquotesp, spentitysp, spequalsp, spsemicolonsp, spopenbsp, spclosebrsp].

In one or more embodiments, a source-target map may be created using the encoded one or more source statements and the encoded equivalent target statements, as in step 506. The source-target map may be represented as F= $\{(\_X^i, \_Y^i)\}_{i=1}^N$ wherein:
   $\_X^i$ represents $i^{th}$ encoded source statement;
   $\_Y^i$ represents $i^{th}$ encoded target statement;
   N represents the total number of encoded source statements which is also same as number of encoded equivalent target statements; and
   i represents each individual encoded item/statement in the list of N items.

Each of the encoded one or more source statement and the encoded equivalent target statement may be split into individual tokens i.e. $\_X^i$=$x1^i$, $x2^i$, $x3^i$ . . . $xs^i$ may be the sequence of tokens in the $i^{th}$ encoded source statement, wherein 's' is equal to length of encoded source statement $\_X^i$. Similarly, $\_Y^i$=$y1^i$, $y2^i$, $y3^i$ . . . $yt^i$ is the sequence of tokens in $i^{th}$ encoded target statement, wherein 't' is equal to length of encoded equivalent target statement $\_Y^i$. For example, $\_X^1$: select sysdate into date from dual spsemicolonsp, then $x1^1$=select, $x2^1$=sysdate, $x3^1$=into, $x4^1$=spentitysp, $x5^1$=from, $x6^1$=dual and $x7^1$=spsemicolonsp. Similarly, $\_Y^1$: select localtimestamp into strict date spsemicolonsp, then $y1^1$=select, $y2^1$=localtimestamp, $y3^1$=into, $y4^1$=strict, $y5^1$=spentitysp, and $y6^1$=spsemicolonsp.

The source-target map may be generated using the updated source vocabulary along with the encoded one or more source statements and the encoded equivalent target statements. For each of the tokens ('w') in the source vocabulary ('$V_x$'), a set of encoded one or more source statements ('$S_w$') containing the token of the source vocabulary may be determined. The set of encoded equivalent target statements ('$T_w$') may also be identified for the determined set of encoded one or more source statements. So, ∀w, wherein w∈$V_x$ (note it is updated source vocabulary and not the original source vocabulary), M pairs of $\_X^N$ and its corresponding $\_Y^N$ may be identified given that w∈$\_X^i$ and M<=N, wherein 'M' represents the number of source statements in which the chosen token 'w' occurs at least once in encoded one or more source statements. The identified pairs of $\_X^N$ and $\_Y^N$ may be stored in '$S_w$' and '$T_w$' respectively. To rule out irrelevant relation between tokens, farther absolute neighbors of 'w' from $\_X^i$ and $\_Y^i$ may be eliminated/ignored by setting a distance limit. The distance limit may be decided based on NMT model's statement length tolerance level and/or on dataset which in-turn depends on source and target programming language. For example, consider that distance limit is set to 100, which may mean that the NMT model's maximum capacity is to accept statements of length up to 100. Also, the distance limit 100 may also indicate the maximum token that can occur in a single statement of programming language, with a possibility that the first token and the 100$^{th}$ token are related. Even, if there is a statement of length more than 100, the first token and 101$^{th}$ token may not at all be related. Exemplary data after determining M pairs of $\_X^N$ and its corresponding $\_Y^N$ are illustrated in Table 3, Table 4, Table 5 and Table 6.

In one or more embodiments Table 3 illustrates set '$S_w$' and '$T_w$' comprising 3 pairs of statements where the token 'select' occurs at least once in encoded one or more source statements. Table 4 illustrates set '$S_w$' and '$T_w$' comprising 1 pairs of statements where the token 'update' occurs at least once in encoded one or more source statements. Table 5 illustrates set '$S_w$' and '$T_w$' comprising 2 pairs of statements where the token 'nextval' occurs at least once in encoded one or more source statements. Table 6 illustrates set '$S_w$' and '$T_w$' comprising 3 pairs of statements where the token 'from' occurs at least once in encoded one or more source statements.

TABLE 3

A set for keyword 'select' from source vocabulary
M = 3

| $S_w$: $S_{select}$ | $T_w$: $T_{select}$ |
|---|---|
| $\_X^1$: [select, sysdate, into, spentitysp, from, dual, spsemicolonsp] | $\_Y^1$: [select, localtimestamp, into, strict, spentitysp, spsemicolonsp] |
| $\_X^3$: [select, spentitysp, spdotsp, nextval, into, spentitysp, from, spentitysp, spsemicolonsp] | $\_Y^3$: [select, nextval, spopenbrsp, spquotesp, spentitysp, spquotesp, spclosebrsp, into, strict, spentitysp, from, spentitysp, spsemicolonsp] |
| $\_X^4$: [select, spstarsp, from, spentitysp, where, spentitysp, spequalsp, spentitysp, spsemicolonsp] | $\_Y^4$: [select, spstarsp, from, spentitysp, where, spentitysp, spequalsp, spentitysp, spsemicolonsp] |

TABLE 4

A set for keyword 'update' from source vocabulary
M = 1

| $S_w$: $S_{update}$ | $T_w$: $T_{update}$ |
|---|---|
| $\_X^2$: [update, spentitysp, set, spentitysp, spequalsp, spentitysp, spdotsp, nextval, where, spentitysp, spequalsp, spentitysp, spsemicolonsp] | $\_Y^2$: [update, spentitysp, set, spentitysp, spequalsp, nextval, spopenbrsp, spquotesp, spentitysp, spquotesp, spclosebrsp, where, spentitysp, spequalsp, spentitysp, spsemicolonsp] |

TABLE 5

A set for keyword 'nextval' from source vocabulary
M = 2

| $S_w$: $S_{nextval}$ | $T_w$: $T_{nextval}$ |
|---|---|
| $\_X^2$: [update, spentitysp, set, spentitysp, spequalsp, spentitysp, spdotsp, nextval, where, spentitysp, spequalsp, spentitysp, spsemicolonsp] | $\_Y^2$: [update, spentitysp, set, spentitysp, spequalsp, nextval, spopenbrsp, spquotesp, spentitysp, spquotesp, spclosebrsp, where, spentitysp, spequalsp, spentitysp, spsemicolonsp] |
| $\_X^3$: [select, spentitysp, spdotsp, nextval, into, spentitysp, from, spentitysp, spsemicolonsp] | $\_Y^3$: [select, nextval, spopenbrsp, spquotesp, spentitysp, spquotesp, spclosebrsp, into, strict, spentitysp, from, spentitysp, spsemicolonsp] |

TABLE 6

A set for keyword 'from' from source vocabulary
M = 3

| $S_w$: $S_{from}$ | $T_w$: $T_{from}$ |
|---|---|
| $\_X^1$: [select, sysdate, into, spentitysp, from, dual, spsemicolonsp] | $\_Y^1$: [select, localtimestamp, into, strict, spentitysp, spsemicolonsp] |
| $\_X^3$: [select, spentitysp, spdotsp, nextval, into, spentitysp, from, spentitysp, spsemicolonsp] | $\_Y^3$: [select, nextval, spopenbrsp, spquotesp, spentitysp, spquotesp, spclosebrsp, into, strict, spentitysp, from, spentitysp, spsemicolonsp] |
| $\_X^4$: [select, spstarsp, from, spentitysp, where, spentitysp, spequalsp, spentitysp, spsemicolonsp] | $\_Y^4$: [select, spstarsp, from, spentitysp, where, spentitysp, spequalsp, spentitysp, spsemicolonsp] |

The above steps may be repeated for all the tokens in the updated source vocabulary. At the end of this step, the count of set of pairs of statements obtained may be equal to number of tokens present in the updated source vocabulary.

In one or more embodiments, a set of intersecting source tokens within the set of pairs of encoded one or more source statements may be determined. An equivalent set of intersecting target tokens within the set of pairs of encoded equivalent target statements may also be determined. The relation between 'w' and '$V_x$' may be represented by '$V_{xw}$' and the relation between 'w' and '$V_y$' may be represented '$V_{yw}$', by which may be generated by intersecting the sequence of tokens from '$S_w$' and '$T_w$' respectively. The '$V_{xw}$' may comprise list of common source tokens within the set '$S_w$' for token 'w' and '$V_{yw}$' may comprise list of common target tokens within the set for token 'w'. With further more source and target statements, the '$S_w$' and '$T_w$' may look like as illustrated in Table 7.

TABLE 7

Set of common/intersecting tokens

| $V_{xw}$ | $V_{yw}$ |
|---|---|
| $V_x$(select) → select, spentitysp, from, spsemicolonsp | $V_y$(select) → select, spentitysp, spsemicolonsp |
| $V_x$(update) → update, spentitysp, set, spentitysp, spequalsp, spentitysp, spdotsp, nextval, where, spentitysp, spequalsp, spentitysp, spsemicolonsp | $V_y$(update) → update, spentitysp, set, spentitysp, spequalsp, nextval, spopenbrsp, spquotesp, spentitysp, spquotesp, spclosebrsp, where, spentitysp, spequalsp, spentitysp, spsemicolonsp |
| $V_x$(nextval) → spentitysp, spdotsp, nextval, spsemicolonsp | $V_y$(nextval) → nextval, spopenbrsp, spquotesp, spentitysp, spquotesp, spclosebrsp, spsemicolonsp |
| $V_x$(from) → Not identified | $V_y$(from) → Not identified |
| $V_x$(dual) → from, dual | — |
| $V_x$(into) → into | $V_y$(into) → into, strict |
| $V_x$(sysdate) → sysdate | $V_y$(sysdate) → localtimestamp |
| $V_x$(spsemicolonsp) → spsemicolonsp | $V_y$(spsemicolonsp) → spsemicolonsp |
| . . . | . . . |

It is to be observed in Table 7 that $V_x$(from) has value 'Not identified' under both '$V_{xw}$' and '$V_{yw}$' which may indicate that no common token is identified in the target statement. Hence source statement is also updated with the status as 'Not identified' as the source-target map is generated on the basis of 1:1 mapping. Also, the entry '$V_x$(dual)→from, dual' under '$V_{xw}$' doesn't contain any corresponding value under '$V_{yw}$' as the token 'dual' is not present in the target statements i.e. 'Vy(dual)→[ ]' and hence no value mentioned under '$V_{yw}$'. It is important to differentiate the above two scenarios ('Not identified' and [ ]) since 'Not identified' denotes that the relation is not yet identified but may be found at later steps whereas the empty set/value ([ ]) may indicate that there cannot be a relation for that particular source token. i.e. there cannot be a relation for 'dual' in target vocabulary (Vy(dual)) since 'dual' is not a keyword from target programming language.

A first subset of source-target map may be generated by removing the determined set of intersecting source tokens from the encoded one or more source statements, and removing the determined set of intersecting target tokens from the encoded equivalent target statements. Remove '$V_{xw}$' and '$V_{yw}$' from every record in 'F' given that sequence '$V_{xw}$' is present in '$\_X^i$' and sequence '$V_{yw}$' is present in After this step, the content in Table 2 may be transformed to, as represented in Table 8.

TABLE 8

Result of eliminating intersecting tokens from source and target statements

| Source | Target |
|---|---|
| $\_X^1$ = [from, dual] | $\_Y^1$ = [ ] |
| $\_X^2$ = [ ] | $\_Y^2$ = [ ] |
| $\_X^3$ = [from] | $\_Y^3$ = [from] |
| $\_X^4$ = [from] | $\_Y^4$ = [from] |

The source tokens '$\_X^i$' in Table 8 are sorted in ascending order based on length of '$\_X^i$'. After sorting, the result may look like as illustrated in Table 9. The priority may be—ascending order of length of source statements. When two or more source statements have same length, sorting may be performed based on length of target statements.

TABLE 9

Sorted statements

| Source | Target |
|---|---|
| $\_X^2$ = [ ] | $\_Y^2$ = [ ] |
| $\_X^3$ = [from] | $\_Y^3$ = [from] |
| $\_X^4$ = [from] | $\_Y^4$ = [from] |
| $\_X^1$ = [from, dual] | $\_Y^1$ = [ ] |

Each token of source tokens and target tokens is parsed in each row, starting from the first row. If all tokens of source tokens and all tokens of target tokens from a row is present in any other row's source tokens and target tokens respectively, then those tokens are removed from that row where it is found. The result may look like as illustrated in Table 10. It is to be observed that the token 'from' is retained in '$\_X^1$' as the target statement '$\_Y^1$' doesn't contain 'from' token. i.e. though the token 'from' of '$\_X^3$' is in '$\_X^1$', removing '$\_X^3$' from '$\_X^1$' is not possible because '$\_Y^3$' is not present in '$\_Y^1$'. It is to be noticed that 1:1 mapping has is maintained throughout the process. Any empty records may be removed from Table 9 to generate first subset of source-target map as illustrated in Table 10.

TABLE 10

First subset of source-target map

| Source | Target |
|---|---|
| $\_X^3$ = [from] | $\_Y^3$ = [from] |
| $\_X^1$ = [from, dual] | $\_Y^1$ = [ ] |

A second subset of source-target map may be generated by determining unique and extracting unique tokens within the set of intersecting source tokens and unique tokens within the set of intersecting target tokens, i.e. Table 7. In other words, the intersecting tokens (or 'common tokens') within the Table 7 are removed. After extracting the unique tokens from Table 7, the resultant is the second subset of source-target map and may look like as illustrated in Table 11.

TABLE 11

Second subset of source-target map

| Source | Target |
|---|---|
| [select] | [select] |
| [update, set] | [update, set] |
| [spdotsp, nextval] | [nextval, spopenbrsp, spquotesp, spquotesp, spclosebrsp] |
| [into] | [into, strict] |
| [spentitysp] | [spentitysp] |
| [where] | [where] |

The source-target map may be generated by combining/appending the first subset of source-target map and the second subset of source-target map, represented as 'F', as illustrated in Table 12.

TABLE 12

Source-Target map

| Source | Target |
|---|---|
| [from] | [from] |
| [from, dual] | [ ] |
| [select] | [select] |
| [update, set] | [update, set] |
| [spdotsp, nextval] | [nextval, spopenbrsp, spquotesp, spquotesp, spclosebrsp] |
| [into] | [into, strict] |
| [spentitysp] | [spentitysp] |
| [where] | [where] |
| . . . | . . . |

In one or more embodiments, the source-target map may comprise tokens indicating rules for transforming source statements to target statements, but effective to such an extent that it covers all the possible relation between the source statements, and between the source and target statements. One such rule that may be inferred from source-target map is that whenever token under source column is identified in source statement, replace that with the one mentioned in the same row under target to achieve translation. For example, if the token 'select' may be present in the source statement, replace it with 'select' while transforming to target statement. If 'into' is present in source statement, replace it with 'into, strict' as per the source-target map. This is one part of application of source-target map. The most significant part is splitting the source statements without breaking the relation between the tokens, i.e. split the source and target statements in a meaningful way. For example, if 'update, set' occurs in source statements, but this relation is to be retained along with threshold length set for the Neural Machine Translation model. The subsequent paragraphs discuss how the source-target map may be used to split source and target statements meaningfully.

In one or more embodiments, all the encoded one or more source statements and the encoded equivalent target statements are split into multiple partitions using the source-target map to generate one or more fragments of the one or more source statements and the equivalent fragments of the one or more target statements, as in step 508. The each of the encoded one or more source statements and the encoded equivalent target statements are fragmented iteratively until—all the tokens in each of the encoded one or more source statements are traversed and the length of fragments of both the encoded one or more source statements and the encoded equivalent target statements are within the predefined threshold. Simpler the statements, lesser the complexity and easier for the model to learn. Hence, statements whose length is beyond the threshold may be split using source-target map, resulting:

$$\Sigma_{i=1}^{N}\Sigma_{j=1}^{M}X^{i,j}=\Sigma_{i=1}^{N}X^{i}$$

$$\Sigma_{i=1}^{N}\Sigma_{j=1}^{M}Y^{i,j}=\Sigma_{i=1}^{N}Y^{i}$$

wherein,

N represents total number of source statements which is also same as number of equivalent target statements;

i represents each individual item/statement in the list of N items

M represents the total number of fragments of a source statement which is also same as number of its equivalent fragments of target statement for every N; and j represents each individual fragment of i;

A sentence length threshold may be set for training records. This limit may decide the maximum length of a sentence that the Neural Machine Translation model receive as input. The sentence length threshold may be number of tokens in a sentence and not number of characters. The sentence length threshold may be applicable for both source statements and target statements. Hence, even if the source statement is within the decided token limit, the target statement may be split if length of the target statement exceeds the token limit. The source statements and target statements which exceed the token limit may go through series of steps where source statements and target statements are fragmented into meaningful and independent pieces without breaking the relation between the tokens and such fragments are created using source-target map.

In one or more embodiments, by applying the source-target map a first fragment of a source statement may be obtained. Based on the number of tokens in the first fragment of the source statement, the number of tokens in the corresponding first fragment in the target statement may be estimated. If the length of first fragment in the target statement is within the token limit, the fragments from both the source statement and target statement may be stored and second fragment in source statement may be figured out and so on. This is performed in an iterative manner until all the tokens in source statement and target statement are traversed and this step is repeated for all the source statements and target statements. In case where the length of the first fragment of the target statement is more than the threshold, then the token limit may be reduced and steps may again start with identifying the first fragment in the source statement and so on. To split the next source statement from the plurality of source statements, the token limit may be set to begin with sentence length threshold set for Neural Machine Translation model and the steps are performed as described in previous paragraphs.

In an example embodiment, consider:

Source Statement ($X^i$): select sysdate-1 yesterday, sysdate as today from dual where deptno_seq.nextval=2

Target Statement ($Y^i$): select localtimestamp-1 yesterday, localtimestamp as today where nextval ('deptno_seq')=2

Encoding the source statements as per the technique discussed in the present disclosure, the encoded Source Statement and Target Statement may look like:

_$X^i$=select sysdate spminussp spzerosp spentitysp spcommasp sysdate as spentitysp from dual where spentitysp spdotsp nextval spequalsp spzerosp _$Y^i$=select localtimestamp spminussp spzerosp spentitysp spcommasp localtimestamp as spentitysp where nextval spopenbrsp spquotesp spentitysp spquotesp spclosebrsp spequalsp spzerosp Let the 't' be threshold set for the model and '$t_c$' be the current token limit. Initially $t_c$=t. For example, consider $t_c$=10 and t=10. If $|\_X^i|\geq t$ or $|\_Y^i|\geq t$, the statement _$X^i$ and _$Y^i$ may be split until all the tokens in _$X^i$ and _$Y^i$ are traversed, wherein $|\_X^i|$ represent length of statement _$X^i$ and $|\_Y^i|$ represent length of statement _$Y^i$. For a given source statement and target statement, $|\_X^i|$=17 and $|\_Y^i|$=18. Both the values are more than 10. Hence, split _$X^i$ meaningfully into _$X^{i,j}$(x1, x2 . . . xk) wherein:

$k \leq t_c$;

i represents the number of source statements;

j represents the number of partitions for (_$X^i$,_$Y^i$);

xk represents the token within a partition; and k represents position/count of token within a partition.

As the source statements and target statements are partitioned as mentioned in various embodiments of the present disclosure, the partitions may look like as illustrated in Table 13.

TABLE 13

| Possible Partitions of Source Statement | | |
| --- | --- | --- |
| _$X^{i,1}$ | _$X^{i,2}$ | Valid partition? |
| _$X^{1,1}$: select sysdate spminussp spzerosp spentitysp spcommasp sysdate as spentitysp from<br>k = 10; j = 1 | _$X^{1,2}$: dual where spentitysp spdotsp nextval spequalsp spzerosp<br>k = 7; j = 2 | ✗ |
| _$X^{1,1}$: select sysdate spminussp spzerosp spentitysp spcommasp sysdate as spentitysp<br>k = 9; j = 1 | _$X^{1,2}$: from dual where spentitysp spdotsp nextval spequalsp spzerosp<br>k = 8; j = 2 | ✓ |

As illustrated in Table 13, in the first iteration, a first possible partitions for and _$X^{1,1}$ and _$X^{1,2}$ may be generated wherein the first partition _$X^{1,1}$ is of length 10 and the remaining tokens of the source statement is considered as second partition _$X^{1,2}$ which meet the criteria of length threshold, but it is to be observed that as per the source-target map in Table 12, the token 'from' and 'dual' needs to be together to retain the relation and to have meaningful split. Hence the token limit is reduced by 1, i.e. $t_c$ is reduced to 9 and the source statement and target statement may be split by setting token limit to 9 in the second iteration. The token limit is reduced by 1 in this case because of relations present in source-target map. The criteria for 'how many points' to be reduced for token limit for meaningful split is discussed in subsequent paragraph. The result would be two partitions, which is of the length 9 and 8 which meets both the conditions of length threshold and meaningful splits, and which are accepted as partitions for source statements. The corresponding partitions in target statement may be identified as described in various embodiments of the present disclosure.

In one or more embodiments, the term 'meaningfully' may describe the relation between tokens in the source statements and adhering not to break the relation between tokens in the source statements. In a vocabulary of any programming language, it may be possible that at least two tokens may appear together all the time in any source code that can be composed using vocabulary of source programming language. For example, 'insert' and 'into' are two such tokens in Oracle® which always occurs together and breaking such relation i.e., the token 'insert' in one partition and the token 'into' in another partition is not meaningful. Tokens like 'alter' and 'table' is another such example. So, such relation between the tokens may be derived and determined while generating source-target map and such relation to be retained while splitting the source statement to multiple partitions.

As mentioned in the earlier paragraphs, this may be considered as one of the criteria to decide to what count the token limit to be reduced during iteration to split statements meaningfully, i.e. without breaking relation between the adjacent tokens which occur together all the time. For example, for given $\_X^{i,j}$(x1, x2 . . . xk), if any sequence of source tokens in source-target map contain 'xk' of $\_X^{i,j}$ and further matches tokens of at least one of the patterns—(xk+succeeding tokens of xk from $\_X^i$), (preceding tokens of xk from $\_X^i$+xk) or (preceding tokens of xk+xk+succeeding tokens of xk from $\_X^i$), then $t_c$ may be reduced by number of points which is the position right before the pattern ($\_X^i$), wherein 'xk' here is the last token of $\_X^{i,j}$. For example, consider a source statement 'a, b, c, d, e, f, g, h'. The source-target map may contain relation of [c, d, e]. The token threshold of the NMT model is 4. The possible partition may be 'a, b, c, d' and 'e, f, g, h'. But the source target map contains the relation [c, d, e], and hence the partition 'a, b, c, d' may not be correct partition as it breaks the relation [c, d, e]. Hence, the determination of tokens may be performed as discussed above. The last token in the first partition is 'd'. The token 'd' may be identified in source-target map, but it contains one preceding token 'c' and one succeeding token 'e' in relation to token 'd'. Now, considering this relation, the remaining token in the source statement which precedes the relation [c, d, e] are two tokens. So, the token count $t_c$ maybe reduced to 2 and iteration is performed to determine the partitions.

Alternatively, the last token in the first partition is 'd' and the relation in the source-target map is [c, d, e], so the token limit may be reduced by 2 since the token 'd' is preceded with one token 'c' and the count is 2 as these two tokens 'c' and 'd' cannot be split. To generalize, it may be number of 'preceding tokens+1' or number of 'succeeding tokens+1'. After multiple iterations, the possible partitions may be 'a, b,', 'c, d, e, f' and 'g, h', which meets both the condition—one: length of all the partitions are within the threshold length; two: the relation between the token is retained as per the source-target map. It is to be observed that the token limit may be increased or decreased while determining the fragments, but it must be less than or equal to threshold length set for NMT model. As per the example embodiment, the chosen partitions are $\_X^{1,1}$: select sysdate spminussp spzerosp spentitysp spcommasp sysdate as spentitysp and $\_X^{1,2}$: from dual where spentitysp spdotsp nextval spequalsp spzerosp.

In one or more embodiments, for each partition in source statement, the equivalent partition in the target statement may be determined, sequentially, as illustrated in previous paragraphs in relation to FIG. 4. For illustration purpose, both the partitions of source statement are considered at a time, as of now. In order to determine the corresponding/equivalent target partitions, after determining partitions in source statement, one or more target tokens for each of the tokens in the determined partitions may be estimated based on source-target map i.e. $\_EY^{i,j}$ for the corresponding $\_X^{i,j}$ may be determined using 'F'—the source-target map, wherein $\_EY^{i,j}$ may represent estimated target tokens. The result may look like as illustrated in Table 14 and Table 15, wherein Table 14 may comprise list of target tokens for each of the tokens of the first partition $\_X^{1,1}$ represented as $\_EY^{1,1}$, and Table 15 may comprise list of target tokens for each of the tokens of the second partition $\_X^{1,2}$ represented as $\_EY^{1,2}$.

TABLE 14

$\_EY^{1,1}$-Target tokens for first partition

| Source Tokens | Candidate Target Tokens |
|---|---|
| select | select |
| sysdate | localtimestamp |
| spminussp | spminussp |
| spzerosp | spzerosp |
| spentitysp | spentitysp |
| spcommasp | spcommasp |
| sysdate | localtimestamp |
| as | as |
| spentitysp | spentitysp |

TABLE 15

$\_EY^{1,2}$-Target tokens for second partition

| Source Tokens | Candidate Target Tokens |
|---|---|
| from | — |
| dual | — |
| where | where |
| spentitysp | spentitysp |
| spdotsp | nextval spopenbrsp spquotesp spclosebrsp |
| nextval | — |
| spequalsp | spequalsp |
| spzerosp | spzerosp |

As a next step, $\_Y^{i,j}$ maybe extracted from $\_Y^i$ according to length of $\_EY^{i,j}$. After extraction, $\_EY^{i,j}$ and $\_Y^{i,j}$ must be identical in terms of length and all tokens in $\_EY^{i,j}$ must be in $\_Y^{i,j}$, as illustrated in Table 16 and Table 17. It is to be observed that order of the tokens need not be identical as source programming language syntax may be different from target programming language syntax. For example, 'a.nextval' is a source statement, but in target statement it is nextval ('a').

TABLE 16

Equivalent target partition for first partition of source statement

| $\_EY^{i,1}$(from Tablet) | $|\_EY^{i,1}|$ | $\_Y^{i,1}$ |
|---|---|---|
| select localtimestamp spminussp spzerosp spentitysp spcommasp localtimestamp as spentitysp | 9 | select localtimestamp spminussp spzerosp spentitysp spcommasp localtimestamp as spentitysp |

TABLE 17

Equivalent target partition for second partition of source statement

| $\_EY^{i,2}$(from Table2) | $|\_EY^{i,2}|$ | $\_Y^{i,2}$ |
|---|---|---|
| where spentitysp nextval spopenbrsp spquotesp spclosebrsp spequalsp spzerosp | 9 | where nextval spopenbrsp spquotesp spentitysp spquotesp spclosebrsp spequalsp spzerosp |

As a next step, the length of the identified fragments of the target statements may be determined and validated by initializing '$t_c$' with 't', i.e. $|EY^{i,j}| \le t$. If the length of the fragments exceeds '$t_c$', token length may be reduced and $\_X^i$ may be re-split and steps are performed are discussed in various embodiments of the present disclosure. With the present example embodiment, the possible source fragments and corresponding target fragments may be:

$\_X^{1,1}$: select sysdate spminussp spzerosp spentitysp spcommasp sysdate as spentitysp $\_X^{1,2}$: select localtimestamp spminussp spzerosp spentitysp spcommasp localtimestamp as spentitysp $\_Y^{1,1}$: from dual where spentitysp spdotsp nextval spequalsp spzerosp $\_Y^{1,2}$: where nextval spopenbrsp spquotesp spentitysp spquotesp spclosebrsp spequalsp spzerosp.

The example embodiment describes one source statement and one target statement. But in real scenario, there may be thousands of statements and the steps discussed in various embodiments of the present disclosure may be performed for all the source statements and target statements to generate the dataset ($\_X^{i,j}\_Y^{i,j}$) which comprises one or more fragments of the one or more source statements and the equivalent fragments of the one or more target statements which may be provided as input to Neural Network causing the generation of trained neural machine translation model for programming languages, as in step 510.

To summarize the technique, the training data in terms of source statements and equivalent targets statements may be received. The source statements and equivalent targets statements may be encoded using source and target vocabulary respectively. Multiple fragments from source statements and target statements may be generated by splitting the source statements (if needed) based on length of the statements. Such generated multiple fragments are used to train NMT model. Whenever the trained NMT model receives a source statement as input, the source statements are transformed to target statements.

The advantage of the technology described in the present disclosure is that the translation between longer statement pairs are complex for NMT models to learn when compared to shorter statement pairs. The present technique configures the NMT models—to learn the mappings between source and target tokens/phrases from the training datasets, and apply them to split each longer statement pair into shorter statement pairs The specification and drawings in the present disclosure are to be regarded in an illustrative rather than a restrictive sense.

What is claimed is:

1. A computer implemented method for training a neural machine translation model, comprising:
    receiving, by a processor, one or more source statements and equivalent target statements;
    encoding, by the processor, the one or more source statements and the equivalent target statements using a predefined token dictionary;
    creating, by the processor, a source-target map using the encoded one or more source statements and the encoded equivalent target statements;
    generating, by the processor, one or more fragments of each of the encoded one or more source statements and the encoded equivalent target statements, iteratively, by applying the source-target map, wherein lengths of fragments of each of the encoded one or more source statements and the encoded equivalent target statements are within a predefined threshold; and
    training, by the processor, the neural machine translation model using the generated one or more fragments.

2. The computer implemented method of claim 1, wherein the creation of the source-target map comprises:
    identifying, by a processor, for each token of a source vocabulary, a set of encoded source statements containing the token and a corresponding set of encoded equivalent target statements;
    determining, by the processor, a set of intersecting source tokens and intersecting target tokens within the set of encoded source statements and the corresponding set of encoded equivalent target statements, respectively;
    generating, by the processor:
    a first subset of the source-target map by removing the determined set of intersecting source tokens and intersecting target tokens, from the set of encoded source statements and the set of encoded equivalent target statements, and
    a second subset of the source-target map by determining unique tokens within the set of intersecting source tokens and intersecting target tokens; and
    generating, by the processor, the source-target map, by appending the first subset of the source-target map and the second subset of the source-target map.

3. The computer implemented method of claim 1, wherein:
    one or more tokens in the one or more source statements are encoded if the one or more tokens are not present in the source vocabulary; and
    one or more tokens in the equivalent target statements are encoded if the one or more tokens are not present in a target vocabulary.

4. The computer implemented method of claim 1, wherein each of the one or more encoded source statements and the equivalent encoded target statements are fragmented until all the tokens in each of the encoded one or more source statements are traversed.

5. A system for training a neural machine translation model, comprising:
    at least one processor; and
    at least one memory unit operatively coupled to the at least one processor, having instructions stored thereon that, when executed by the at least one processor, causes the at least one processor to:
    receive one or more source statements and equivalent target statements;

encode the one or more source statements and the equivalent target statements using a predefined token dictionary;
create a source-target map using the encoded one or more source statements and the encoded equivalent target statements;
generate one or more fragments of each of the encoded one or more source statements and the encoded equivalent target statements, iteratively, by applying the source-target map, wherein lengths of fragments of each of the encoded one or more source statements and the encoded equivalent target statements are within a predefined threshold; and
train the neural machine translation model using the generated one or more fragments.

6. The system of claim 5, wherein the at least one processor causing the creation of the source-target map, is configured to execute one or more instructions to:
identify for each token of a source vocabulary, a set of encoded source statements containing the token and a corresponding set of encoded equivalent target statements;
determine a set of intersecting source tokens and intersecting target tokens within the set of encoded source statements and the corresponding set of encoded equivalent target statements, respectively;
generate:
a first subset of the source-target map by removing the determined set of intersecting source tokens and intersecting target tokens, from the set of encoded source statements and the set of encoded equivalent target statements, and
a second subset of the source-target map by determining unique tokens within the set of intersecting source tokens and intersecting target tokens; and
generate the source-target map by appending the first subset of the source-target map and the second subset of the source-target map.

7. The system of claim 5, wherein:
one or more tokens in the one or more source statements are encoded if the one or more tokens are not present in the source vocabulary; and
one or more tokens in the equivalent target statements are encoded if the one or more tokens are not present in a target vocabulary.

8. The system of claim 5, wherein each of the encoded one or more source statements and the equivalent encoded target statements are fragmented until all the tokens in each of the encoded one or more source statements are traversed.

9. A non-transitory computer readable medium having stored thereon instructions for training a neural machine translation model, comprising machine executable code which when executed by at least one processor, causes the at least one processor to perform steps comprising:

receiving one or more source statements and equivalent target statements;
encoding the one or more source statements and the equivalent target statements using a predefined token dictionary;
creating a source-target map using the encoded one or more source statements and the encoded equivalent target statements;
generating one or more fragments of each of the encoded one or more source statements and the encoded equivalent target statements, iteratively, by applying the source-target map, wherein lengths of fragments of each of the encoded one or more source statements and the encoded equivalent target statements are within a predefined threshold; and
training the neural machine translation model using the generated one or more fragments.

10. The non-transitory computer readable medium of claim 9, wherein the creation of the source-target map comprises:
identifying for each token of a source vocabulary, a set of encoded source statements containing the token and a corresponding set of encoded equivalent target statements;
determining a set of intersecting source tokens and intersecting target tokens within the set of encoded source statements and the corresponding set of encoded equivalent target statements, respectively;
generating:
a first subset of the source-target map by removing the determined set of intersecting source tokens and intersecting target tokens, from the set of encoded source statements and the set of encoded equivalent target statements, and
a second subset of the source-target map by determining unique tokens within the set of intersecting source tokens and intersecting target tokens; and
generating the source-target map by appending the first subset of the source-target map and the second subset of the source-target map.

11. The non-transitory computer readable medium of claim 9, wherein:
one or more tokens in the one or more source statements are encoded if the one or more tokens are not present in the source vocabulary; and
one or more tokens in the equivalent target statements are encoded if the one or more tokens are not present in a target vocabulary.

12. The non-transitory computer readable medium of claim 9, wherein each of the encoded one or more source statements and the equivalent encoded target statements are fragmented until all the tokens in each of the encoded one or more source statements are traversed.

* * * * *